(12) United States Patent
Itagaki et al.

(10) Patent No.: US 8,086,377 B2
(45) Date of Patent: Dec. 27, 2011

(54) SUSPENSION CONTROL APPARATUS

(75) Inventors: Noriaki Itagaki, Yokohama (JP);
Nobuyuki Ichimaru, Yokohama (JP);
Takahide Kobayashi, Kawaguchi (JP);
Tatsuya Gankai, Chiba (JP); Takanori Fukao, Kyoto (JP)

(73) Assignees: Hitachi, Ltd., Tokyo (JP); Kobe University, Kobe (JP)

( * ) Notice: Subject to any disclaimer, the term of this patent is extended or adjusted under 35 U.S.C. 154(b) by 429 days.

(21) Appl. No.: 12/468,321

(22) Filed: May 19, 2009

(65) Prior Publication Data

US 2009/0292419 A1 Nov. 26, 2009

(30) Foreign Application Priority Data

May 20, 2008 (JP) ................. 2008-132529

(51) Int. Cl.
*G05D 3/12* (2006.01)
(52) U.S. Cl. .............. 701/48; 701/37; 280/5.5
(58) Field of Classification Search .......... 701/37, 701/48; 280/5.5, 5.512, 5.515; 73/11.04, 73/11.05; 74/473.29; 188/378–380
See application file for complete search history.

(56) References Cited

OTHER PUBLICATIONS

"Control Design Method of Semi-Active Suspensions with Actuators", presented by Takanori Fukao, Takafumi Suzuki and Koichi Osuka at the Society of Instrument and Control Engineers Control Division Fifth Conference held on May 25-27, 2005.

*Primary Examiner* — Paul N Dickson
*Assistant Examiner* — Nicole Verley
(74) *Attorney, Agent, or Firm* — Wenderoth, Lind & Ponack, LLP

(57) ABSTRACT

The present invention provides a suspension control apparatus capable of an excellent vibration control by a model thereof designed to incorporate nonlinearity and a time-lag element of a control damper. The present invention employs the backstepping method which is one of nonlinear control methods, and is designed so as to incorporate the nonlinearity of a damper 4. In addition, a nonlinear controller 5 uses a damping force Fu obtained by expressing the dynamics of a damping force characteristic variable portion [damping force Fu(v, i)] by a first-order lag system, so as to compensate the dynamics of the damper 4, whereby a control system is formed so as to incorporate the time-lag element of the control damper. As a result, it is possible to reduce time lag, and to practically adjust a control force according to the characteristics of the control damper.

7 Claims, 6 Drawing Sheets

(a) SPRUNG ACCELERATION (b) ERROR BETWEEN H∞ CONTROLLER OUTPUT AND ACTUAL DAMPING FORCE (a)

CORRECTION OF PISTON SPEED

| ACTUAL PISTON SPEED [m/s] | PISTON SPEED USED IN CONTROL [m/s] |
|---|---|
| IN THE CASE OF $0 \leq v \leq \varepsilon$ | $v = \varepsilon$ |
| IN THE CASE OF $-\varepsilon \leq v < 0$ | $v = -\varepsilon$ |

Fig. 11

CONTROL LAW

| | NONLINEAR DAMPER | LINEAR DAMPER |
|---|---|---|
| DYNAMICS INCORPORATED | PRESENT ENBODIMENT | CONTROL TECHNIQUE B |
| DYNAMICS NOT INCORPORATED | CONTROL TECHNIQUE C | CONTROL TECHNIQUE D |

SUSPENSION CONTROL APPARATUS

BACKGROUND OF THE INVENTION

The present invention relates to a suspension control apparatus operable to control vibration of a vehicle such as automobile with use of a control damper.

As an example of conventional suspension control apparatus, there is known a suspension control apparatus in which a model of an actuator used in the control apparatus is taken into consideration (non-patent literature 1: "Control Design Method of Semi-Active Suspensions with Actuators" presented by Takanori Fukao, Takafumi Suzuki and Koichi Osuka at the Society of Instrument and Control Engineers Control Division Fifth Conference held on May 25-27, 2005, which is hereby incorporated by reference herein).

SUMMARY OF THE INVENTION

However, the suspension control apparatus disclosed by Fukao et al. employs a first-order linear model, which is too simple for practical use, as the model of the actuator (control damper) used in the control apparatus. Therefore, it is difficult to use this control apparatus in a real environment as it is.

In a suspension control apparatus, since an actuator (control damper) used therein generally has strong nonlinearity and a time-lag element, a required force cannot be always generated at a required time, and a difference (error) between required and generated forces may occur. Although there has been a demand for preventing this situation from occurring, conventional arts have been unable to take any measures for it.

The present invention has been contrived in consideration of the above-mentioned circumstance, and an object thereof is to provide a suspension control apparatus capable of performing an excellent vibration control by taking into consideration nonlinearity and a time-lag element of a control damper when designing a model thereof.

The present invention is a suspension control apparatus operable to reduce vibration of a vehicle by providing a control force to the vehicle adapted to output a vibration signal indicating a vibration state. The suspension control apparatus comprises a control damper operable to generate the control force according to an instruction signal, a feedback controller operable to calculate a desired control force based on the vibration signal, an observer operable to calculate an estimated control force based on the vibration signal and the instruction signal, and a compensator operable to output the instruction signal based on the desired control force, the estimated control force and an extension/compression speed of the control damper, so as to compensate a dynamics of the control damper. In the suspension control apparatus, the estimated control force is calculated by multiplying a nonlinear gain by the instruction signal, and then by a dynamics function of the control damper.

BRIEF DESCRIPTION OF THE DRAWINGS

FIG. 10 shows a table about piston speed correction; and

FIG. 11 shows a table about conditions of control laws of the present embodiment and other techniques compared with the present embodiment.

DETAILED DESCRIPTION OF THE INVENTION

Hereinafter, a suspension control apparatus of an embodiment of the present invention will be described with reference to the accompanying drawings.

Figure 1:
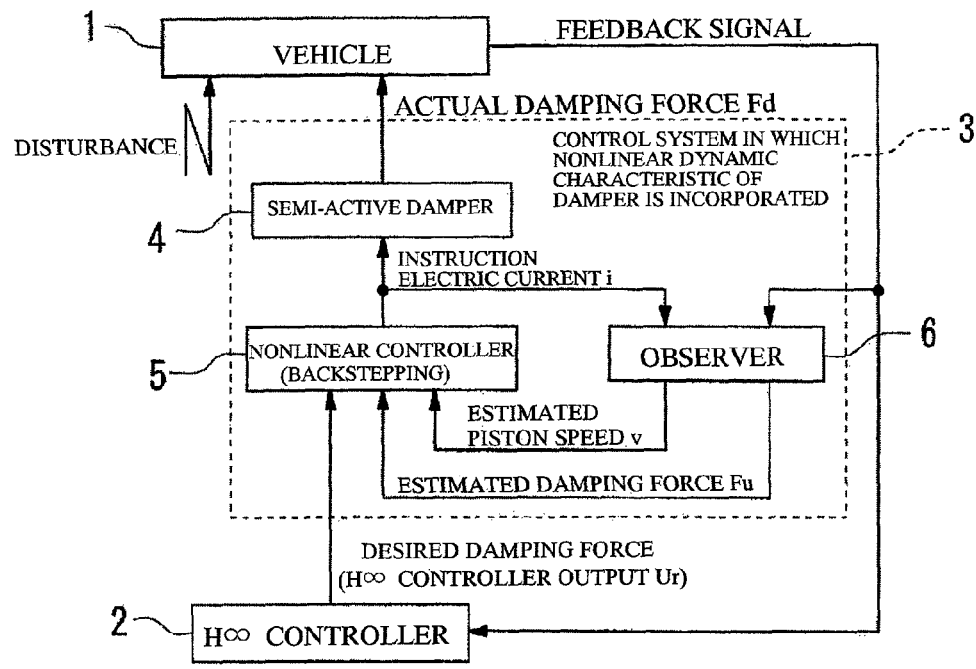
FIG. 1 is a block diagram schematically illustrating a suspension control apparatus of an embodiment of the present invention.

FIG. 1 is a block diagram schematically illustrating a suspension control apparatus of an embodiment of the present invention. Referring to FIG. 1, the suspension control apparatus of the present embodiment of the present invention comprises an H∞ controller 2 operable to calculate a desired damping force (desired control force) based on a vibration signal (feedback signal) indicating a vibration state of a vehicle 1, and a control system 3 operable to provide an actual damping force Fd to the vehicle 1 by receiving an input of the desired damping force (an output ur of the H∞ controller) provided from the H∞ controller 2. The vibration signal of the vehicle 1 is output from movement detecting means disposed at the vehicle 1 and operable to detect a movement (for example, an acceleration, a speed, and a displacement) of a vertical vibration of the vehicle. The movement detecting means is, for example, embodied by a vertical G sensor (acceleration sensor). In the present embodiment, the H∞ controller 2 corresponds to a feedback controller.

The control system 3 includes a semi-active damper 4 (a damper of a semi-active suspension) which is an exemplary embodiment of a control damper, a nonlinear controller 5 which is an exemplary embodiment of a compensator, and an observer 6. As will be described later, the control system 3 is designed so as to incorporate the nonlinear dynamic characteristic (dynamics) of the semi-active damper 4 (hereinafter also referred to as just "damper 4" when it is appropriate or convenient to do so). That is, in the control system 3, the control of the vehicle body portion (vehicle 1) and the control of the damper portion (damper 4) are separately treated. For the control of the vehicle body of the vehicle 1, a linear model is employed and therefore a linear H∞ control (H∞ controller 2) is used. On the other hand, for the control of the damper portion (damper 4) having strong nonlinearity, the backstepping method (described later), which is one of nonlinear control methods, is employed to control the semi-active damper 4 (control damper) and therefore control vibration of the vehicle body. In sum, in the control system 3, the nonlinearity of the damper 4 is taken care of by employment of the backstepping method which is one of nonlinear control methods.

In the backstepping method, an instruction electric current i is generated so that a damping characteristic variable portion (control force) in the actual damping force Fd approaches the H∞ controller output ur. In this control method (the backstepping method), the transient characteristic of acceleration is improved, i.e., the jerk (the rate of change of acceleration) is reduced so as to reduce vibration in the higher frequency domain than the frequency of sprung resonance, by reducing the error between an estimated damping force Fu (estimated control force) and the H∞ controller output ur. The above-mentioned observer 6 performs estimation processing to the damping characteristic variable portion while taking into consideration the nonlinear dynamics of the damper 4, and outputs the estimated damping force Fu. Furthermore, the observer 6 outputs a speed v (piston speed) of a not-shown piston disposed at the damper 4. [The piston speed v corresponds to an extension/compression speed of the damper 4. The piston speed v is also referred to as "estimated piston speed v".] In the present embodiment, the piston speed v is estimated with use of the observer 6. However, the piston speed v may be calculated with use of a vehicle height sensor and a differentiator. In this case, system cost is increased, although the piston speed v can be more accurately calculated.

Modeling of the nonlinear dynamics of the semi-active damper 4 will now be described with reference to FIGS. 2 and 3.

Figure 2:
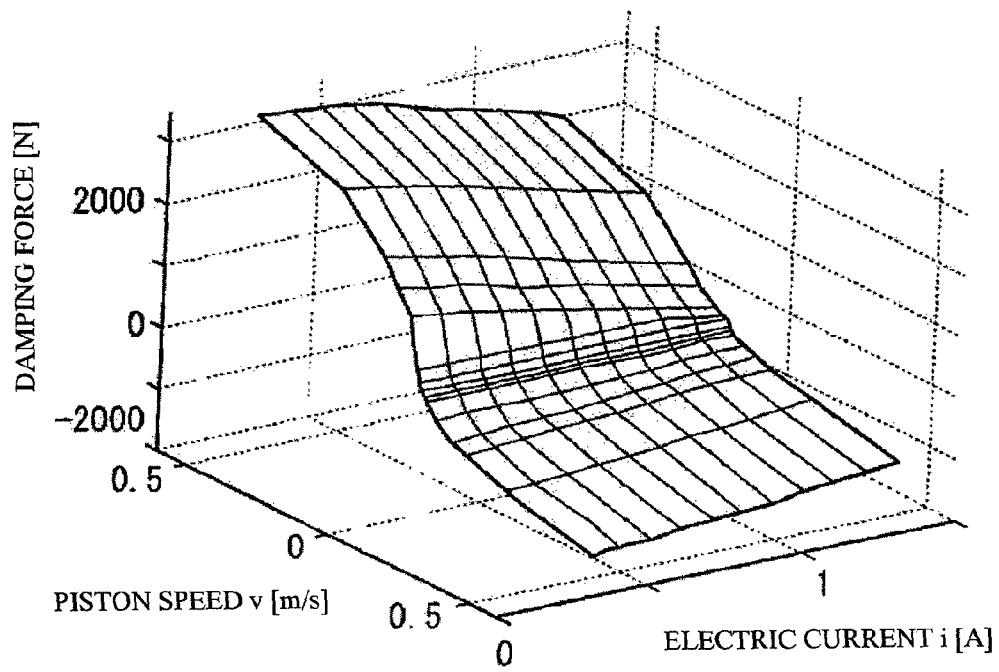
FIG. 2 shows the damping force characteristic of a semi-active damper shown in FIG. 1.

The semi-active damper 4 shown in FIG. 1 generates a damping force depending on the instruction electric current i and the piston speed v of the damper 4 as shown in the map of FIG. 2, and has the nonlinear characteristic. In addition, the semi-active damper 4 does not generate a damping force when the piston speed v is around 0 m/s, and therefore also has the bilinear characteristic.

The damping force Fd(v, i) [corresponding to an actual damping force, and hereinafter also referred to as "actual damping force Fd" when it is appropriate to do so] generated by the damper 4 can be expressed by the sum of the damping force Fu(v, i) of the damping force characteristic variable portion which depends on the instruction electric current i and the piston speed v, and a damping force Fy(v) of the damping force characteristic invariable portion (=the damping force characteristic in the soft mode) which only depends on the piston speed v, as follows:

$$Fd(v,i)=Fu(v,i)+Fy(v) \quad (1)$$

[It should be noted that, in the present embodiment, the estimated damping force Fu is the damping force of the damping force characteristic variable portion.] Especially, Fu(v, i) can be expressed by the following equation (2) as a linear equation with respect to the instruction electric current i:

$$Fu=Fk(v)\cdot i \quad (2)$$

In the present embodiment, an instruction signal is embodied by the instruction electric current i, although it may be embodied by any signal capable of causing the control damper to generate a predetermined control force, such as voltage.

Since Fu(v, i) can be expressed by the equation (2), Fk(v) is considered as a slope (hereinafter also referred to as "nonlinear gain" when it is appropriate to do so) with respect to the instruction electric current i. In the present embodiment, the slope Fk(v) is a nonlinear element. Fk(v) [inverse function of tangent (arc tan function), nonlinear gain calculating means] is approximated to obtain the following equation (3), based on the slope of the damping force with respect to the instruction electric current i calculated from the actual damping force characteristic:

$$Fk(v)=(a/b)\tan^{-1}(b\cdot v) \quad (3)$$

The values of a and b are set as the following equations (4), based on actual data shown in FIG. 2:

$$F_k(v) = \begin{cases} a = 7000, b = \dfrac{a}{550} \cdot \dfrac{\pi}{2}, & (-0.6 \le v \le 0) \\ a = 19000, b = \dfrac{a}{1550} \cdot \dfrac{\pi}{2}. & (-0 \le v \le 0.6) \end{cases} \quad (4)$$

Figure 3:
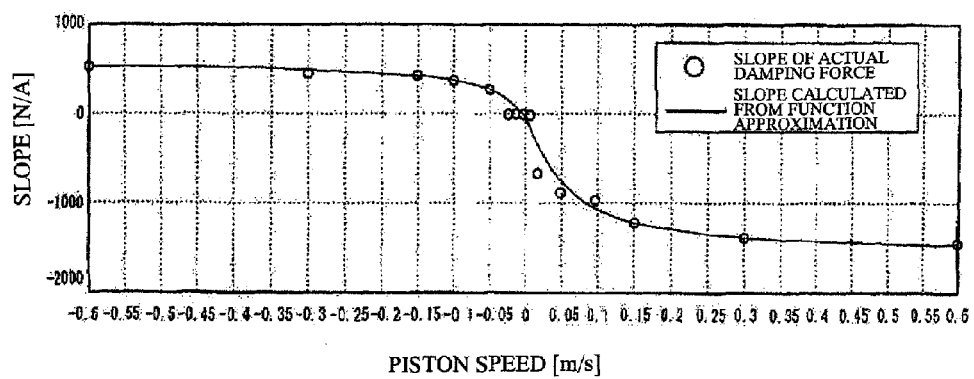
FIG. 3 shows the slope of damping force with respect to instruction electronic current per piston speed of the semi-active damper shown in FIG. 1.

FIG. 3 shows the slope of the damping force with respect to the instruction electric current i for each piston speed. FIG. 3 shows the slope obtained from the damping force characteristic of the actual data, and the slope calculated from function approximation of the equation (4).

In order to compensate the dynamics of the damper 4, the dynamics of the damping force characteristic variable portion [damping force Fu(v, i)] is expressed by a first-order lag system. The damping force Fu is expressed by the following equation (5) with use of the time constant T:

$$Fu=Fk(v)\cdot i/(Ts+1) \quad (5)$$

in which 1/(Ts+1) is a dynamics function. The equation (5) is a frequency-domain representation using the Laplace operator s. When the observer 6 shown in FIG. 1 estimates the actual damping force Fd, the estimated damping force Fu is obtained by calculation based on the instruction electric current i and the piston speed v with use of the map shown in FIG. 2 or the equation (5). A time-domain representation of the equation (5) is as the following equation (6):

$$\dot{F}_u = -\dfrac{1}{T}F_u + \dfrac{F_k(v)}{T}i. \quad (6)$$

Use of this equation (6) in the above-mentioned backstepping method enables incorporation of the nonlinear dynamics of the damper 4. In the present embodiment, the equation (6) is used in the backstepping method so that the nonlinear dynamics of the damper 4 can be incorporated. In the present embodiment, the time constant T is set as T=0.02 in the equation (5), based on experiment data.

In the present embodiment, as mentioned above, as to the estimated damping force Fu, the dynamics of the damping force characteristic variable portion [damping force Fu(v, i)] is expressed by the first-order lag system, and the thus-obtained estimated damping force Fu is used by the nonlinear controller 5. Therefore, the dynamics of the damper 4 can be compensated and the control system can be designed so as to incorporate the time-lag element of the control damper.

Figure 4:
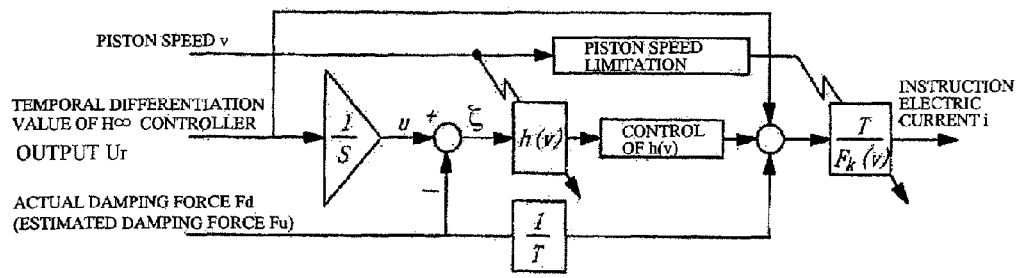
FIG. 4 is a block diagram schematically illustrating a nonlinear controller shown in FIG. 1.

The above-mentioned backstepping method employed by the nonlinear controller 5 and used for calculation of the instruction electric current i will now be described with reference to FIG. 4. It should be noted that FIG. 4 does not particularly show a unit (differentiator) for obtaining a temporal differentiation (time derivative) value ur' of the H∞ controller output ur by performing temporal differentiation to the H∞ controller output ur provided from the H∞ controller 2.

The error between the estimated damping force Fu of the above-mentioned damping force characteristic variable portion and the H∞ controller output ur is defined as ζ=ur−Fu. The error temporal differentiation value expressed by the following equation (7) is obtained by differentiating both sides of this equation, and then substituting the equation (6).

$$\dot{\zeta} = \dot{u}_r + \frac{1}{T} Fu - \frac{F_k(v)}{T} i \quad (7)$$

Here, i is chosen to satisfy the following equation (8):

$$i = \frac{T}{F_k(v)} \left( h\zeta + \dot{u}_r + \frac{1}{T} F_u \right), h > 0. \quad (8)$$

Then, the error temporal differentiation value is expressed by the following equation (9):

$$\dot{\zeta} = -h\zeta. \quad (9)$$

If t∞, then ζ→0 and therefore stabilization can be realized.

In the equations (8) and (9), h is a positive constant. If the constant h is small, convergence of the error will take a lot of time. However, if the constant h is too large, divergence may occur due to the limitation of the instruction electric current i. A try and error process is required for selection of the constant h. If the piston speed is 0 in the equation (8), the nonlinear gain Fk(v) becomes 0, and therefore the instruction electric current i will diverse. Therefore, a correction is made so that the piston speed (the piston speed used for the control) for calculating the nonlinear gain Fk(v) is always over a predetermined value. In particular, the piston speed is corrected as shown in the table of FIG. 10. In the present embodiment, ϵ is set to 0.01 m/s in the table of FIG. 10, in consideration of the influence of measurement noise.

Furthermore, the constant h in the equation (8) is changed to a speed dependency parameter as the following equation (10), in order to deal with the singularity where the piston speed v becomes uncontrollable around the origin:

$$h(v)=(v/\lambda)2+\delta. \quad (10)$$

It should be noted that, in the equation (10), the piston speed v is not regulated as shown in FIG. 10. Here, λ and δ are positive constants. In the present embodiment, λ is set to 0.01 and δ is set to 0.1 through a try and error process based on simulations. In addition, we set a limit of h(v)≦100 so that the constant h does not become too large. The equation (10) is in the form of quadratic function, and a control is not forcibly performed around the origin where the piston speed v becomes uncontrollable, by reducing the value of the error ζ when the piston speed v is around the origin.

As mentioned above, in the present embodiment, the control system 3 employs the backstepping method which is one of nonlinear control methods, and the control system 3 is designed so as to incorporate the nonlinearity of the damper 4. In addition, the nonlinear controller 5 uses the damping force Fu obtained by expressing the dynamics of the damping force characteristic variable portion [damping force Fu(v, I)] by a first-order lag system, so that the dynamics of the damper 4 can be compensated, and the time-lag element of the control damper can be incorporated. As a result, it is possible to curb the influence of time lag, and to practically adjust a control force according to the characteristics of the control damper.

Furthermore, according to the present embodiment, since the control system is designed so as to compensate both of the nonlinearity and the dynamics of the control damper, it is possible to reduce the error between the desired damping force and the actual damping force (in fact, the damping force characteristic variable portion in the actual damping force), and therefore it is possible to reduce both of sprung acceleration and jerk. Since it is possible to reduce both of sprung acceleration and jerk in this way, it is possible to improve ride quality. In addition, since it is possible to compensate response lag of the control damper, it is possible to reduce both of sprung acceleration and jerk and therefore to improve ride quality even with an inexpensive control damper having low responsiveness.

That is, according to the present embodiment, it is possible to perform an excellent vibration control, since the model is designed so as to incorporate the nonlinearity and the time lag element of the control damper.

We conducted several tests on the suspension control apparatus configured as mentioned above. In particular, we did (a) full vehicle simulation, (b) four wheels shaking test and (c) actual vehicle running test, to prove effectiveness of the control method employed in the suspension control apparatus, in which the nonlinearity and the lag element are taken into consideration. The details and the results of the tests are as follows.

For the above-mentioned tests, we selected a large sedan with a sprung vertical acceleration sensor equipped thereto as a vehicle to be controlled. The piston speed used in the control was estimated by an adaptive VSS (Variable Structure System) observer (refer to the observer 6 shown in FIG. 1) from the sprung vertical acceleration signal detected by the sprung vertical acceleration sensor. Then, the damping force was estimated based on the estimated piston speed and the instruction electric current to obtain the estimated damping force, and the estimated damping force was output to the nonlinear controller (refer to the nonlinear controller 5 shown in FIG. 1).

The conditions of the control laws of the present embodiment and other techniques compared with the present embodiment are as shown in the table of FIG. 11. As shown, the present embodiment employs a control law incorporating both of the nonlinearity and the dynamics of the damper 4. The techniques compared with the present embodiment include Control Technique B employing a control law incorporating only the dynamics of the damper (refer to damper 4 shown in FIG. 1), Control technique C employing a control law incorporating only the nonlinearity of the damper (refer to damper 4 shown in FIG. 1), and Conventional Technique D employing a control law ignoring both of the nonlinearity and the dynamics the damper (refer to damper 4 shown in FIG. 4) and employing only a linear H∞ control. As the H∞ controller 2, the same controller was used in all of the techniques. In addition, the techniques compared with the present embodiment include a standard vehicle equipped with a passive suspension (the data thereof is shown as "standard" in FIGS. 8 and 9), which was also compared with the present embodiment as will be mentioned below.

(a) Full Vehicle Simulation

We carried out a simulation of random wave shaking with the frequency range narrowed to 0.5 to 20 Hz, and a simulation of log sweep shaking with the shaking amplitude maintained and the frequency range of 0.3 to 4 Hz, using a full vehicle model.

Figure 5:
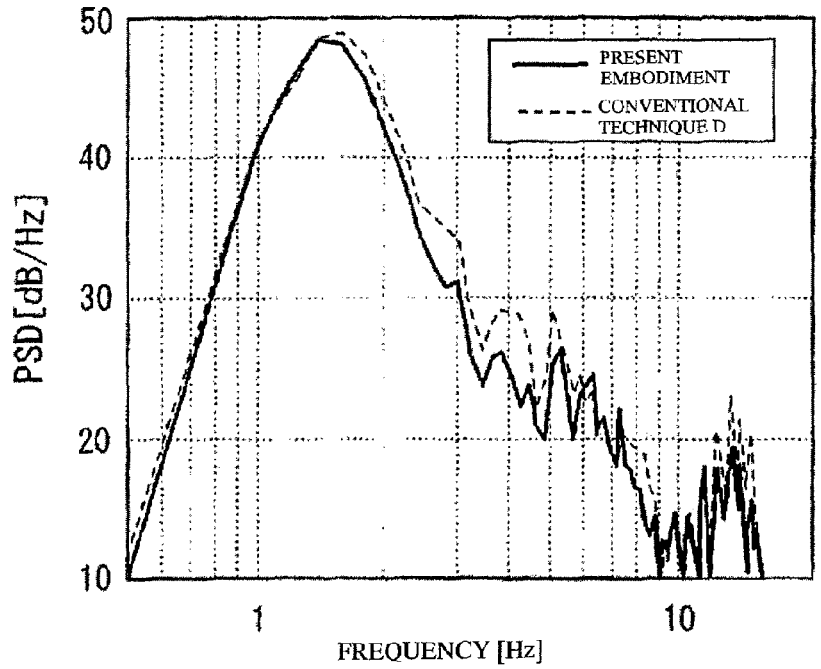
FIG. 5 is a characteristic chart showing the power spectrum density (PSD) of sprung acceleration during random wave shaking, which is obtained by a full vehicle simulation.

FIG. 5 shows the power spectrum density (PSD) of sprung acceleration obtained by the random wave shaking. The damping performances of the present embodiment and Conventional Technique D are similar in the low frequency range and around the frequency of sprung resonance. However, the PSD of the present embodiment is reduced more than that of Conventional Technique D in the higher frequency range than the frequency of sprung resonance.

Figure 6:
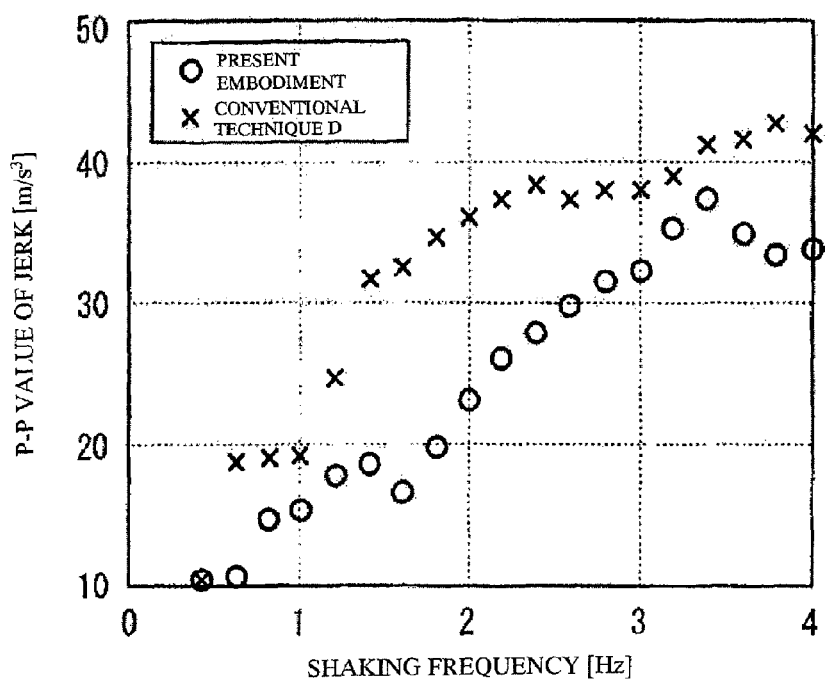
FIG. 6 is a characteristic chart showing the P-P value of sprung jerk per shaking frequency during log sweep shaking, which is obtained by the full vehicle simulation.

FIG. 6 shows the P-P value (Peak-to-Peak value) of sprung jerk per shaking frequency obtained by the log sweep shaking. We obtained the result that the jerk in the present embodiment was reduced more than that in Conventional Technique D over the all range of shaking frequency.

(b) Four Wheels Shaking Test

Figure 7:
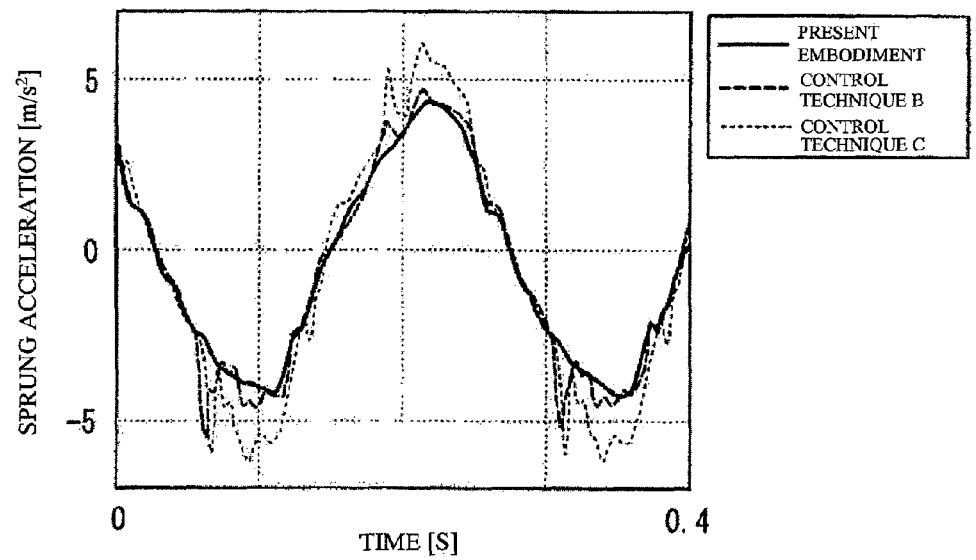
FIG. 7 shows the results of time history response in an actual-vehicle four-wheels in-phase shaking test with the frequency of 4 Hz, and in particular, FIG. 7 ($a$) shows time/sprung vertical acceleration characteristic, and FIG. 7($b$) shows time/characteristic of the error between an H∞ controller output and an actual damping force.
Figure 7:
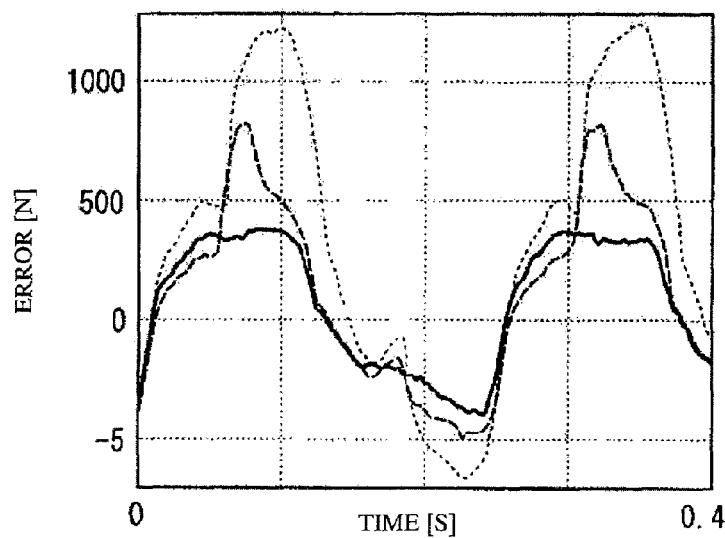

FIG. 7 shows results of time history response obtained by an actual-vehicle four-wheels in-phase shaking test with the frequency of 4 Hz. In particular, FIG. 7(a) shows the time/sprung acceleration (sprung vertical acceleration) characteristic, and FIG. 7(b) shows the characteristic of the error between the H∞ controller output ur and the actual damping force Fd, showed correspondingly to time.

As is apparent from the result shown in FIG. 7(a), the response in the present embodiment is smoother than those in Control Techniques B and C, and the sprung acceleration in the present embodiment is reduced more than those in Control Techniques B and C. The present embodiment can provide a more excellent result than Control Techniques B and C in this way, because that the error controls thereof are different as shown in FIG. 7(b). The smaller the error shown in FIG. 7(b) is, the more the H∞ controller output ur (refer to FIG. 1), which is a desired damping force, is transmitted to the vehicle. It can be understood that, when the sprung acceleration in Control Technique C largely changes, i.e., when the jerk is deteriorated, the error also becomes large correspondingly to the large change in the sprung acceleration. In this way, an excellent result could not be obtained in Control Technique C, and this is because the dynamics of the damper is not taken into consideration in Control Technique C.

Since Control Technique B is designed so as to incorporate the dynamics of the damper, the error is smaller and the sprung acceleration is more reduced in Control Technique B, compared to Control Technique C. However, since the nonlinearity of the damper is not taken into consideration in Control Technique B, the error is often larger than that in the present embodiment, and at those times, the error largely changes, and the sprung acceleration also largely changes and therefore the jerk is deteriorated.

Since the present embodiment employs the control system designed so as to incorporate both of the nonlinearity and the dynamics of the damper 4, as is apparent from the above-mentioned test results, the error can be smaller, and the sprung acceleration and the jerk can be more reduced by maximally utilizing the performance of the H∞ controller 2, compared to Control Techniques B and C.

(c) Actual Vehicle Running Test

Figure 8:
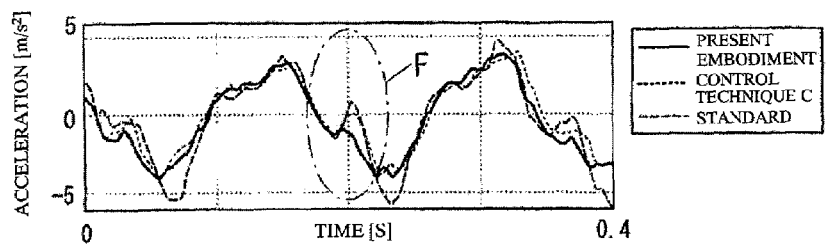
FIG. 8 shows the results of time history response when a vehicle ran on a bumpy road surface, and in particular, FIG. 8($a$) shows the sprung acceleration, and FIG. 8($b$) shows the sprung jerk.
Figure 8:
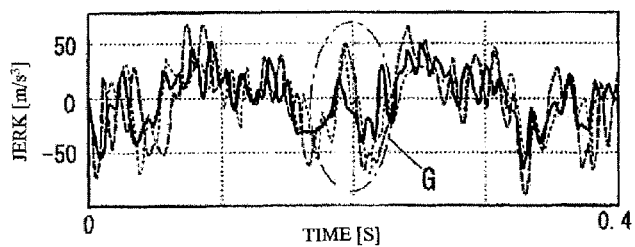

FIG. 8 shows time history response when the vehicle ran on a bumpy surface that would cause sprung resonance. In particular, FIG. 8(a) and FIG. 8(b) show sprung acceleration and sprung jerk, respectively. The drawing indicate that the P-P value of the sprung acceleration can be equally reduced in the present invention and Control Technique C, compared to the standard vehicle (the vehicle equipped with a passive suspension). However, in the area surrounded by the dashed-dotted line F in FIG. 8(a), the sprung accelerations of Control Technique C and the standard vehicle largely change. As to the sprung jerk at this time, as indicated by the area surrounded by the dashed-dotted line G in FIG. 8(b), the P-P value of the sprung jerk in the present embodiment is just a half of that in Control Technique C. These factors significantly affect actual ride comfort. The test results indicate that the present embodiment can provide an more excellent ride quality than Control Technique C.

Figure 9:
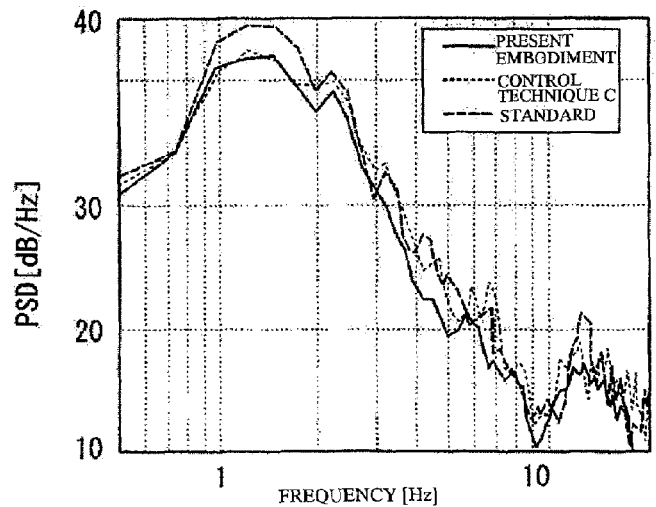
FIG. 9 shows the PSD of sprung acceleration when a vehicle ran on a road surface including a bumpy road and a rough road (the result of a ride quality test)

FIG. 9 shows the PSD of sprung acceleration when the vehicle ran on a road surface including a bumpy road and a rough road. The PSDs of the present embodiment and Control Technique C can be reduced to a same degree around the frequency of sprung resonance, compared to the standard vehicle. However, only the PSD of the present embodiment can be reduced more than that of the standard vehicle in the higher frequency range than the frequency of sprung resonance. In this way, the present embodiment exhibits a higher damping effect than Control Technique C.

In the above-mentioned embodiment, the H∞ controller 2 is used as the feedback controller. However, another feedback controller such as a skyhook controller or an LQ controller may be used instead of the H∞ controller.

In the above-mentioned embodiment, Fk(v) [inverse function of tangent (arc tan function)] serves as the nonlinear gain calculating means. However, a map including the nonlinear gain [i.e., a coefficient determined according to the spring speed v, which can produce the estimated control force Fu by being multiplied by the instruction electric current i] may be used instead of Fk(v).

In the above-mentioned embodiment, the dynamics function is formed assuming the control damper is a first-order lag system. However, the dynamics function may be formed assuming the control damper is another time lag system such as a two-order lag system.

In the above-mentioned embodiment, the semi-active damper 4 is used as the control damper. However, in some embodiments, an active damper (either an electronic actuator or a hydraulic actuator) may be used instead of the semi-active damper. Even if the control damper is an active damper, the estimated control force can be expressed by the sum of the control force characteristic variable portion (Fu) which depends on the instruction signal and the estimated relative speed, and the control force characteristic invariable portion (Fy). Therefore, these embodiments can be handled in the same manner as the above-mentioned present embodiment.

In the above-mentioned embodiment, the instruction electric current (electric signal) is used as the instruction signal. However, another signal such as an optical signal may be used instead of the electric signal.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2008-132529, filed on May 20, 2008. The entire disclosure of Japanese Patent Application No. 2008-132529, filed on May 20, 2008 including specification, claims, drawings and summary is incorporated herein by reference in its entirety.

What is claimed is:

1. A suspension control apparatus operable to reduce vibration of a vehicle by providing a control force to the vehicle adapted to output a vibration signal indicating a vibration state, the suspension control apparatus comprising:

a control damper operable to generate the control force according to an instruction signal;

a feedback controller operable to calculate a desired control force based on the vibration signal;

an observer operable to calculate an estimated control force based on the vibration signal and the instruction signal; and a compensator operable to output the instruction signal based on the desired control force, the estimated control force and an extension/compression speed of the control damper, so as to compensate a dynamics of the control damper, wherein the estimated control force is calculated by multiplying a nonlinear gain by the instruction signal, and then by a dynamics function of the control damper.

2. The suspension control apparatus according to claim 1, wherein the estimated control force meets the following equation:

$$Fu = Fk \cdot i/(Ts+1),$$

in which Fu represents the estimated control force, Fk represents the nonlinear gain, i represents an electric current value of the instruction signal, s represents the Laplace operator, and T represents a time constant of the control damper.

3. The suspension control apparatus according to claim 1, wherein the control damper comprises a damping force adjustable damper having a damping force characteristic adjustable according to the instruction signal, the damping force adjustable damper operable to generate the control force according to the damping force characteristic and the extension/compression speed; and the observer is operable to calculate the extension/compression speed based on the vibration signal and the instruction signal.

4. The suspension control apparatus according to claim 1, wherein the control damper comprises either an electric actuator or a hydraulic actuator.

5. The suspension control apparatus according to claim 1, wherein the instruction signal has a value constantly causing a reduction in an error between the desired control force and the estimated control force.

6. The suspension control apparatus according to claim 5, wherein the instruction signal comprises an instruction electric current meeting the following equation:

$$i = \frac{T}{F_k(v)}\left(h\zeta + \dot{u}_r + \frac{1}{T}F_u\right), h > 0,$$

in which i represents an electric current value of the instruction signal, T represents a time constant of the control damper, Fk represents the nonlinear gain, h is a positive constant number, $\zeta$ represents the error between the desired control force and the estimated control force, $u_r$ represents the desired control force, and Fu represents the estimated control force.

7. The suspension control apparatus according to claim 1, wherein the compensator comprises a nonlinear controller including a nonlinear element.

* * * * *